Feb. 5, 1957  L. ROBINSON  2,780,315
ANTI-SKID APPARATUS FOR VEHICLES
Filed Nov. 2, 1955  4 Sheets-Sheet 1
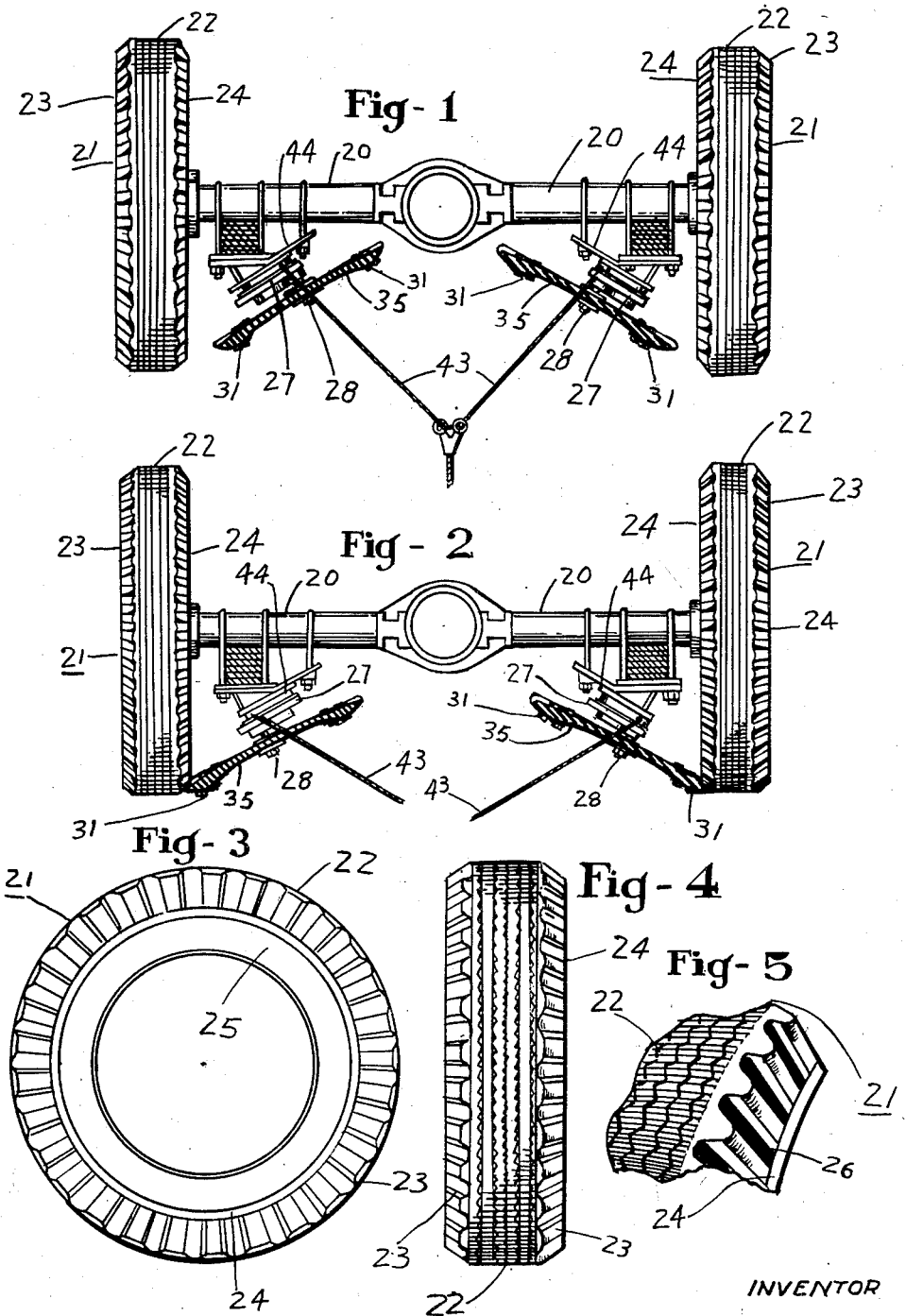
INVENTOR
LUTHER ROBINSON
BY Archworth Martin
ATTORNEY

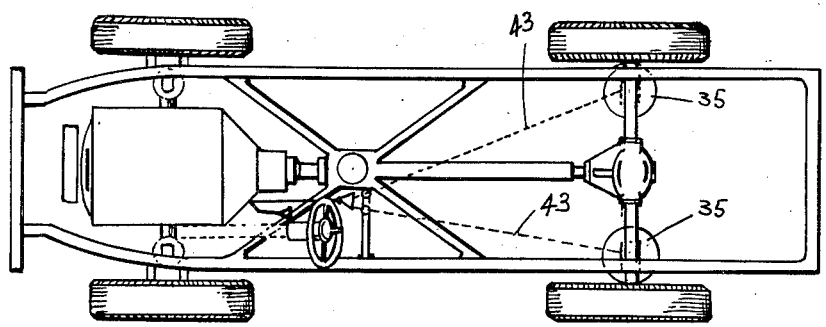
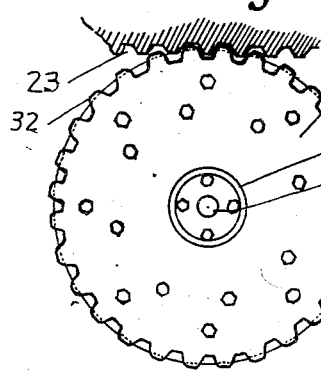
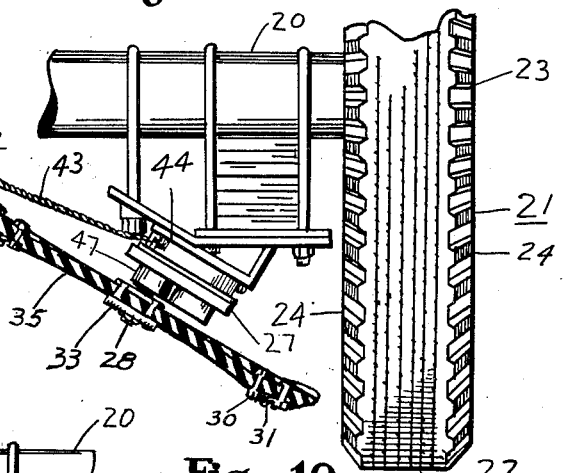
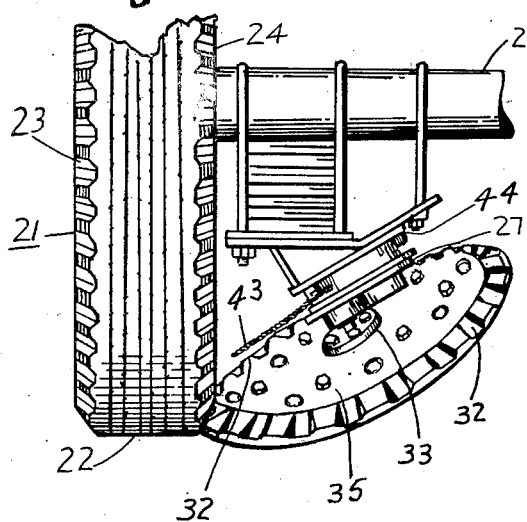
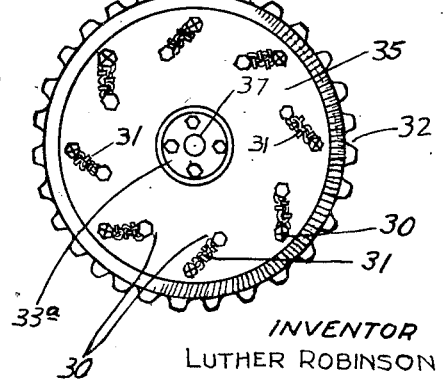

Feb. 5, 1957
L. ROBINSON
2,780,315
ANTI-SKID APPARATUS FOR VEHICLES
Filed Nov. 2, 1955
4 Sheets-Sheet 3
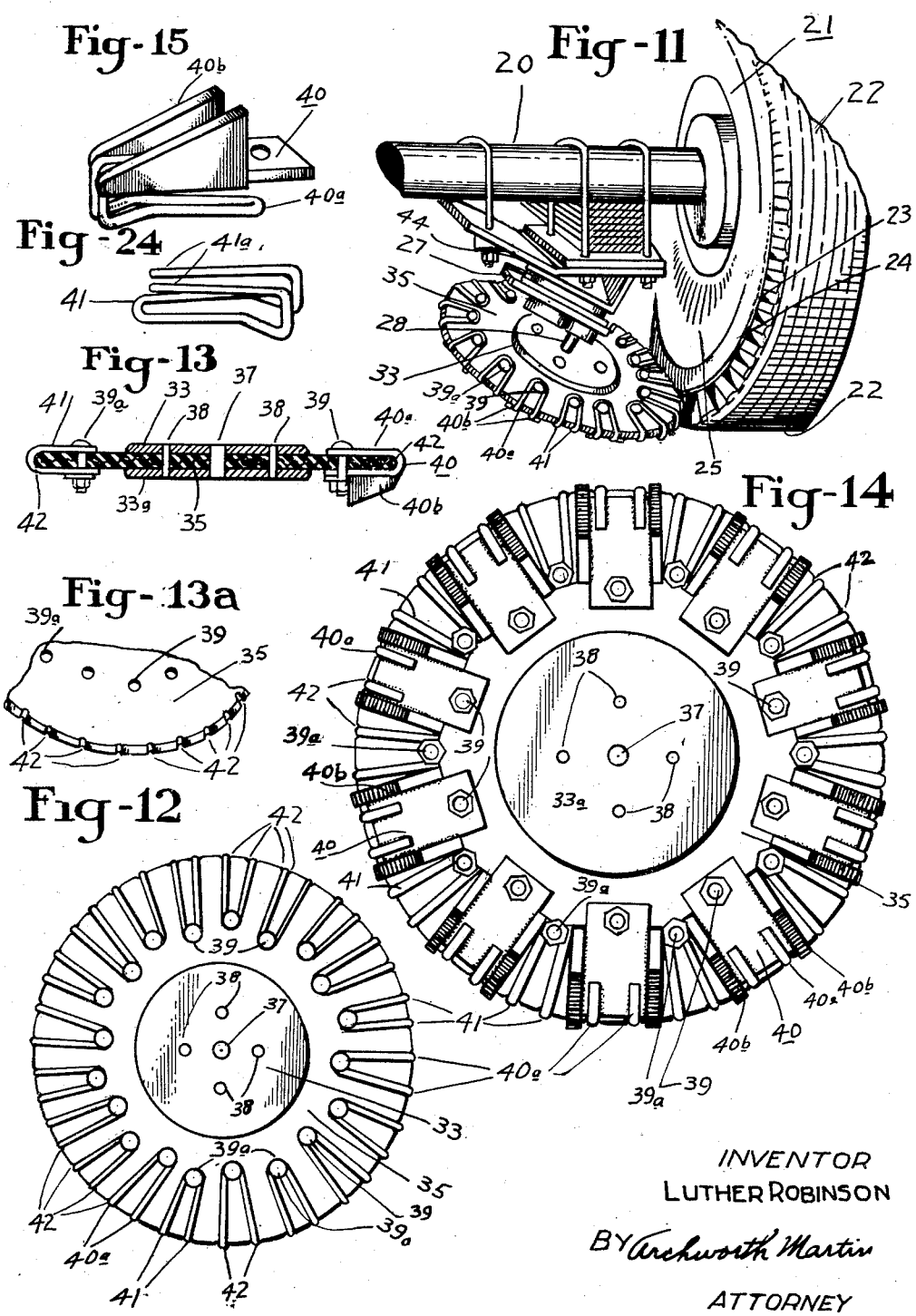
INVENTOR
LUTHER ROBINSON
BY Archworth Martin
ATTORNEY Feb. 5, 1957 L. ROBINSON 2,780,315
ANTI-SKID APPARATUS FOR VEHICLES
Filed Nov. 2, 1955 4 Sheets-Sheet 4
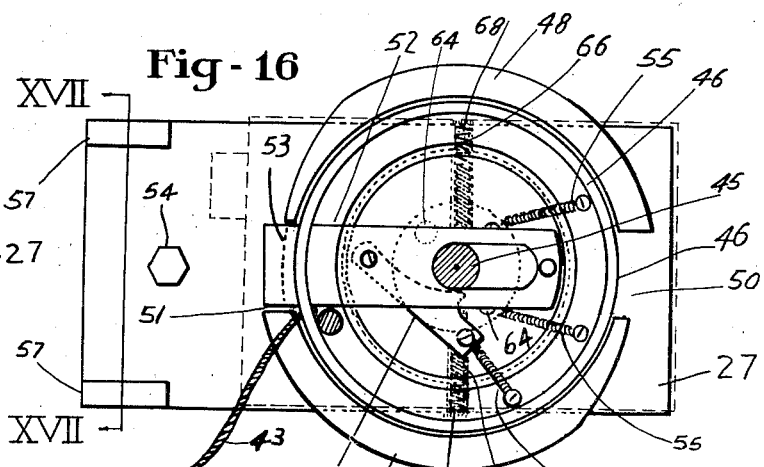
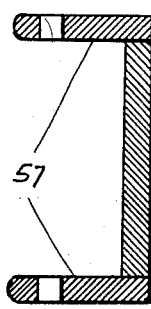
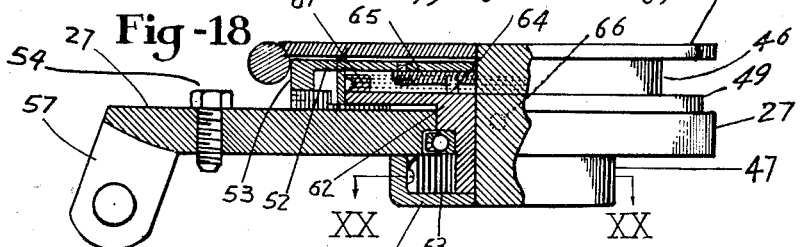
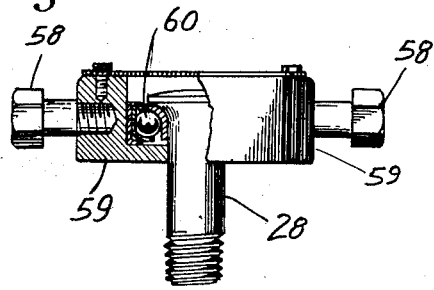
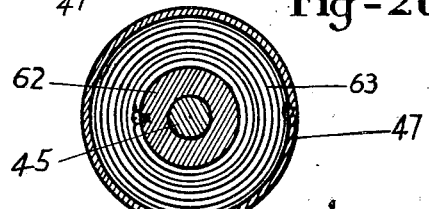
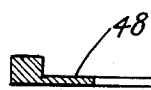
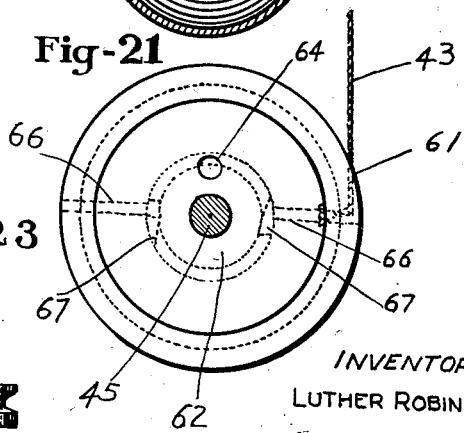
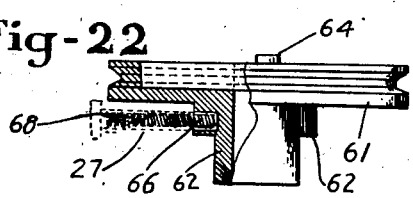
INVENTOR
LUTHER ROBINSON
BY Archworth Martin
ATTORNEY United States Patent Office
2,780,315
Patented Feb. 5, 1957

2,780,315

ANTI-SKID APPARATUS FOR VEHICLES

Luther Robinson, Pittsburgh, Pa.

Application November 2, 1955, Serial No. 544,448

8 Claims. (Cl. 188—4)

My invention relates to anti-skid apparatus, and more particularly to those for use with the tires on the rear wheels of motor vehicles, to prevent slipping and skidding thereof, and constitutes a modification of and in some respects an improvement upon my application Serial No. 525,920, filed August 2, 1955.

One object of my invention is to provide anti-skid devices of the character referred to that can be so manipulated from the driver's seat of the vehicle that they will be moved into and out of operative position against the edges of the tire treads and the roadway during traveling movement of the vehicle, it being unnecessary to stop the vehicle or to back it up in order to manipulate the anti-skid members.

Another object of my invention is to provide an anti-skid device of the rotatable-disc type which, while fully effective to resist slipping or skidding of the vehicle wheels, will have a longer life and smoother action in service than various previous anti-skid structures of this type.

Still another object of my invention is to provide anti-skid devices of the said disc type so positioned and manipulated that the vehicle tires will engage and disengage with respect thereto simply by traveling or rolling movement of the wheels.

As shown in the accompanying drawings, Figure 1 is a schematic view of the rear portion of an automobile with my anti-skid elements raised to inoperative position;

Fig. 2 is a view thereof, showing the position occupied by the anti-skid discs when they have swung downwardly and outwardly into operative position with the edges of the tire treads at the rear wheels;

Fig. 3 is a side view of one of the tires;

Fig. 4 is a view of the tread thereof;

Fig. 5 is a fragmentary view showing tooth-like ribs on the edge of a tire tread or a re-tread;

Fig. 6 is a plan view of a vehicle showing the schematic arrangement of my apparatus with respect thereto;

Fig. 7 is an enlarged view of one of the anti-skid discs and its mounting;

Fig. 8 is a plan view showing the disc of Fig. 7 in operative position;

Fig. 9 is a view showing the manner in which the disc is positively rotated by the vehicle wheel;

Fig. 10 is a bottom plan view of the disc;

Fig. 11 is a view showing a modified form of the anti-skid disc in engagement with a vehicle tire;

Fig. 12 is a top plan view of the disc, on a larger scale;

Fig. 13 is a sectional view thereof; Fig. 13a is a fragmentary perspective view of the disc plate;

Fig. 14 is a bottom plan view, on an enlarged scale;

Fig. 15 is a perspective view showing certain of the element of Fig. 14;

Fig. 16 is a plan view of mechanism for swinging a disc into and out of operative position;

Fig. 17 is a view taken on the line XVII—XVII of Fig. 16;

Fig. 18 is a partial sectional view of the apparatus of Fig. 16, but with the housings and covers in place;

Fig. 19 is a partial sectional view of a mounting block for connecting the disc to its supporting arm;

Fig. 20 is a view taken on the line XX—XX of Fig. 18;

Fig. 21 is a plan view of the operating pulley for swinging the disc;

Fig. 22 is an edge view thereof, partly in section,

Fig. 23 is a section through the swivel arm of Figs. 16 and 18; and Fig. 24 an enlarged view of a clip.

As shown in the drawings, my device is applied to a vehicle having the conventional tubular axle housing 20 in which are journaled the axles that carry the pneumatically tired wheels. The tires 21 of the wheels are of a well-known form, wherein the tread 22 has tooth-like corrugations 23 at the edges, where they meet the side walls 25. The corrugations 23 will function somewhat as gear teeth, to rotate the anti-skid discs.

The discs are rotatably supported by swinging arms or plates 27 which are operable from the driver's seat, to swing the discs to and from the positions shown in Figs. 1 and 2, as described in my copending application and as will be hereinafter more fully explained.

The discs 35 are idly rotatable about their axes at bolts 28, under tractive forces of the tires 21. The discs are rubber or similar flexible material, reinforced by cords or fabric and are somewhat enlarged and beveled near their peripheries.

Each disc has a central hole at 37 for bolts 28 upon which the disc rotates. Bolts 30 extend through the disc and through short lengths 31 of tire chains. The heads of the bolts 30 supplement the tire chains as traction elements and will be replaced when the chains and the bolt heads become worn down.

As described and claimed in my previous application and as hereinafter explained more in detail, the disc-carrying arms 27 are swung in inclined planes between their inoperative and operative positions. When the disc is swung from the position of Fig. 1 forwardly and downwardly in position to be engaged by the edge of the tire tread, its thickened beveled edges will be pressed tightly against the roadway by the beveled edge of the tire tread as shown in Fig. 2, the disc will be automatically locked at that position as hereinafter explained.

The area of engagement between the edge of the tire and the disc will be increased or enhanced somewhat by the fact that the tire tends to flatten and bulge slightly at the roadway. The tooth-like ribs 23 on the shoulders 24 will mesh with tooth-like studs or ribs 32 (Fig. 9) on the upper beveled surface of the disc. Metal washers or plates 33 and 33a are bolted to the upper and lower surface of the disc, and serve as a hub for the bolt-like shaft 28. The traction elements 30—31 are pressed against the roadway by the tire, and slippage of the tire on the disc is prevented by the intermeshing ribs or teeth at 23 and 32. Traveling movement of the vehicle will thus rotate the disc and skidding or slipping will be prevented by the bolt heads 30 and chains 31.

An important feature of the invention resides in the fact that the disc and its anti-skid elements do not extend any distance under the road-engaging surface of the tire tread. If the rotatable discs should be extended entirely under and across the tire tread, there would be much unnecessary and ineffective abrasion, and wear occurs rapidly. This is avoided by my arrangement without reducing the effectiveness of the device.

In Figs. 11 to 15, I show the preferred form of my invention, since it is more suitable for general use than the other forms. For example, the specially-formed tread or retread of Fig. 5, with its large molded teeth, will be more suitable for larger trucks, whereas the arrangement shown in Figs. 11 to 15, and particularly the anti-skid disc thereof, is quite suitable for use on passenger cars and other light vehicles, as well as with truck tires.

The structure shown in these figures comprises hub plates 33 and 33a and a fabric-reinforced rubber disc 35 having a circular hole 37 for the shaft bolt 28 and being riveted or bolted at 38 to the plates 33 and 33a. Bolts 39 serve to connect clip plates 40 to the disc 35. Rods or heavy wires 40a have leg portions welded to the plates 40 and to calks 40b of beveled form that are welded to the plates 40. The members 40 and 40b can be forged as a single piece, if desired.

As shown more clearly in Fig. 13, the bolts 39 extend through the clips 40a and through the plates 40, to hold them in place and clamp them tightly against the disc 35. The outer bends of the members 40a and the wire clips 41 are embedded in notches 42 in the edge of the disc 35. The heavy wire clips 41 are secured to the disc 35, by bolts 39a.

The upper legs of the wire clip-like members 40a and 41 serve as ribs and cause the disc to be rotated on its shaft 28 by engagement with the ribs 23 on the edges of the tire tread 22. This driving force is exerted usually in conjunction with the ribs or teeth 23 at the edges of the tire tread, but sometimes will occur through contact only between the smooth shoulder area 24 of the tire tread and the members 40a and 41. Tests have shown that even if the teeth 23 do not engage the disc member, there will be sufficient pull exerted by the relatively smooth shoulder area 24 when it bears against the members 40a and 41 with considerable force.

At its underside, the disc structure will have engagement with the roadway mainly through the calks or flanges 40b. The beveled shape of the road-contacting edges of these calks 40b, together with the inclined position of the disc structure not only gives good gripping action, but produces a smooth beveled gear drive effect as between the disc and the tire, thereby reducing excessive stresses and grinding action of the calks 40b on the roadway, as compared to what would take place if the disc were in a somewhat horizontal position between the tire and the roadway.

In Figs. 16 to 23, I show the operating mechanism for moving the discs into and out of operative position at the tire treads. The apparatus is operated at the driver's seat by cables 43, each pull on the cords or cables serving to swing the swivel arm 27 that carries the disc, a distance of 180°, the cables then being returned to their take-up position for another operation as hereinafter explained, and as explained more at length in my said copending application.

The mechanism for supporting and manipulating each disc is carried by a bracket plate 44 which is, in turn, supported from the axle housing 20 by suitable U-bolts or the like. A king bolt 45 rotatably supports the operating mechanism from the bracket plate 44. A housing 46 is welded to the bracket arm 44. The swiveled bracket plate 27 is rotatably supported on a spring housing 47 that is rigidly held in place by the bolt 45. Ribs 48 and 49 are formed on the upper side of the arm 27, their ends being spaced apart as shown at 50 and 51, so that they may serve as stop surfaces for a latch bar 52 that extends slidably through the wall of the housing 46.

The latch bar 52 has a down-turned lip at 53 which is moved into and out of position to be engaged by the ends of the ribs 48 and 49 in the spaces at 50 or 51, at each half revolution of the arm 27. The bar 52 is slidable through a slot in the stationary housing 46 and is yieldably urged outwardly from the position shown in Fig. 16 to a position where its lip 53 will enter the spaces at 50 or 51, by the tension of springs 55 that are anchored in the housing 46 which is rigidly connected to the bracket plates 44.

The swivel arm 27 has ears 57 to receive cap screws 58 that serve as a shaft for pivotally supporting a bearing housing 59 for the shaft bolt 28 upon which the hub-forming washers 33 and 33a of the discs 35 are positioned. An anti-friction bearing 60 is provided between the housing and the shaft 28.

A pulley 61 is contained in the housing 46 and has a hub 62 that extends through the arm 27 into the spring housing 47. Each of the pull cables 43 is secured to the periphery of its pulley, to rotate it against the tension of a coil spring 63, one end of which is secured to the spring housing 47 and the other end of which is anchored to the hub 62 of the pulley. The pulley carries a stud 64 on its upper surface in position to temporarily engage a trigger 65 that is pivotally carried by the latch bar 52.

After disengagement of the trigger from the stud, further movement of the pulley by the cable is imparted to the swivel arm plate 27 by a clutch device that comprises plungers 66 that are backed by springs 68 that are contained within a hole that extends through the arm 27, the plungers 66, upon each half revolution of the pulley, engaging stop shoulders 67 in the sides of the hub 62 to thereby serve as a one-way clutch. Starting at the position shown in Fig. 16, when the pulley is initially moved, its stud 64 will engage the trigger 65 and move it and the bar 52 against tension of the springs 55 and 69, thereby pushing the latch bar out of the space 51, and thereupon escaping past the trigger 65 while thereby releasing the arm 27 for swinging movement upon further rotation of the pulley 6. The latch bar 52 after 180° movement by arm 27 will then be snapped back by the springs 55, into the space 50. Upon release of the cable 43 at the driver's seat, the spring 63 in the housing 47 which has been tensioned through turning movement of the pulley, will snap the pulley back into position to again pick up the clutch at 66—67.

Assuming that the last-named movement has swung the arm 27 inwardly and upwardly to swing the disc away from the roadway, and it is desired to return the disc to its operative position in Fig. 8, the cable 43 will be again pulled to shift the latch bar from the stop shoulders at 50 and, through continued pull on the cable, the pulley will be rotated to swing the arm to the position shown in Fig. 16, thereby allowing the latch bar 52 to snap backwardly under the tension of the springs 55, so that its stop shoulder 53 will enter the opening at 51 and hold the disc in its operative position shown in Fig. 2.

The disc, being flexible, and having free tilting movements on its trunnions 58, adapts itself readily to uneven pavements. A stop screw 54 engages the top of the casing 59 and limits tilting of the disc which is overbalanced on its trunnions, so that it tends to assume a horizontal plane when raised.

The flexibility of the discs 35 both in directions perpendicular to the plane of the disc and in radial directions when the edge of the disc is crowded against an obstruction or the side of a tire is important, because it will not only adapt itself readily to uneven and rough road surfaces, but will not be so susceptible of damage. Also, the clips 41 and 40a are close enough to one another to greatly protect the edge of the disc from fraying and wearing away rapidly, the notches 42 in the edges of the discs serving to prevent shifting of these ribs along the edge of the disc. Instead of being merely notched into the disc, the clip wires can be actually embedded therein.

I claim as my invention:

1. A traction device for wheeled vehicles, comprising a tire that has an area which extends in a generally sloping direction from the road-engaging area of the tread to the side wall of the tire, an anti-skid disc rotatably supported from the vehicle, on an inclined axis, the upper face of the disc having a circular row of radially-extending rib-like elements in position to engage the said sloping area, anti-skid protuberances on the lower face of the disc adjacent to its periphery, in position to engage a roadway when said row of radially-extending rib-like elements engage said sloping area, means mounting the disc for movement toward and from the wheel, means positively limiting the movement toward the wheel to a position where the periphery of the disc is approximately at the line where the road-engaging area of the tire tread and the said sloping area meet and the rib-like elements are pressed against the sloping area, and means for producing said movement.

2. The combination with an axle housing and a vehicle wheel having a pneumatic tire which has an area that extends in a generally sloping direction from the road-engaging area of its tread to the side wall of the tire, of a bracket carried by the axle housing, an arm supported by the bracket and movable toward and from the tire, a circular disc supported by the arm for rotation about an inclined axis, anti-slip protuberant elements on the upper and lower surfaces of the edge of the disc, and means for shifting the arm in an inclined direction, to bring the annular edge of the disc into and away from a position of engagement against a roadway at the line where the sloping edge of the tire and its road-engaging tread surface meet, the sloping area of the tire having ribs that extend in a generally radial direction and mesh with the protuberant elements on the upper surface of the disc.

3. A device as recited in claim 1, wherein the disc is flexible.

4. A device as recited in claim 1, wherein the said anti-skid protuberances are in the form of bar-like calks of beveled form, held in place by bolts that extend through them and the disc.

5. A device as recited in claim 1, wherein the said anti-skid protuberances are in the form of chains held in place by bolts that extend through them and the disc.

6. A device as recited in claim 1, wherein the rib-like elements and the protuberances are unitarily connected and are in the form of clips that are held in embracing engagement with the edge of the disc.

7. A device as recited in claim 1, wherein the edge of the disc is of beveled form.

8. A device as recited in claim 1, wherein the rib-like elements and protuberances comprise rods bent to the form of clips that embrace the edge of the disc and are so closely spaced as to protect the peripheral edge of the disc against substantial wear.

References Cited in the file of this patent

UNITED STATES PATENTS

| | | |
|---|---|---|
| 1,150,148 | Putnam | Aug. 17, 1915 |
| 2,140,606 | Stickles | Dec. 20, 1938 |
| 2,241,923 | Ridgway | May 13, 1941 |
| 2,264,466 | Weisel | Dec. 2, 1941 |
| 2,277,036 | Chaussee | Mar. 24, 1942 |
| 2,283,948 | Ridgway | May 26, 1942 |
| 2,295,837 | Gerth | Sept. 15, 1942 |
| 2,463,634 | Martinis | Mar. 8, 1949 |
| 2,622,702 | Klein | Dec. 23, 1952 |
| 2,747,691 | Lakey et al. | May 29, 1956 |
| 2,767,808 | Sutter | Oct. 23, 1956 |

FOREIGN PATENTS

| | | |
|---|---|---|
| 25,015 | Great Britain | Nov. 17, 1905 |